(No Model.)  4 Sheets—Sheet 1.

W. W. EVANS.
TYPE WRITING MACHINE.

No. 374,047. Patented Nov. 29, 1887.

Witnesses
Geo. W. Young.
Hy. A. Lamb.

Inventor
W. Warrington Evans.
By his Attorneys
Jammu+ Kinkle (No Model.) 4 Sheets—Sheet 2.
W. W. EVANS.
TYPE WRITING MACHINE.
No. 374,047. Patented Nov. 29, 1887.
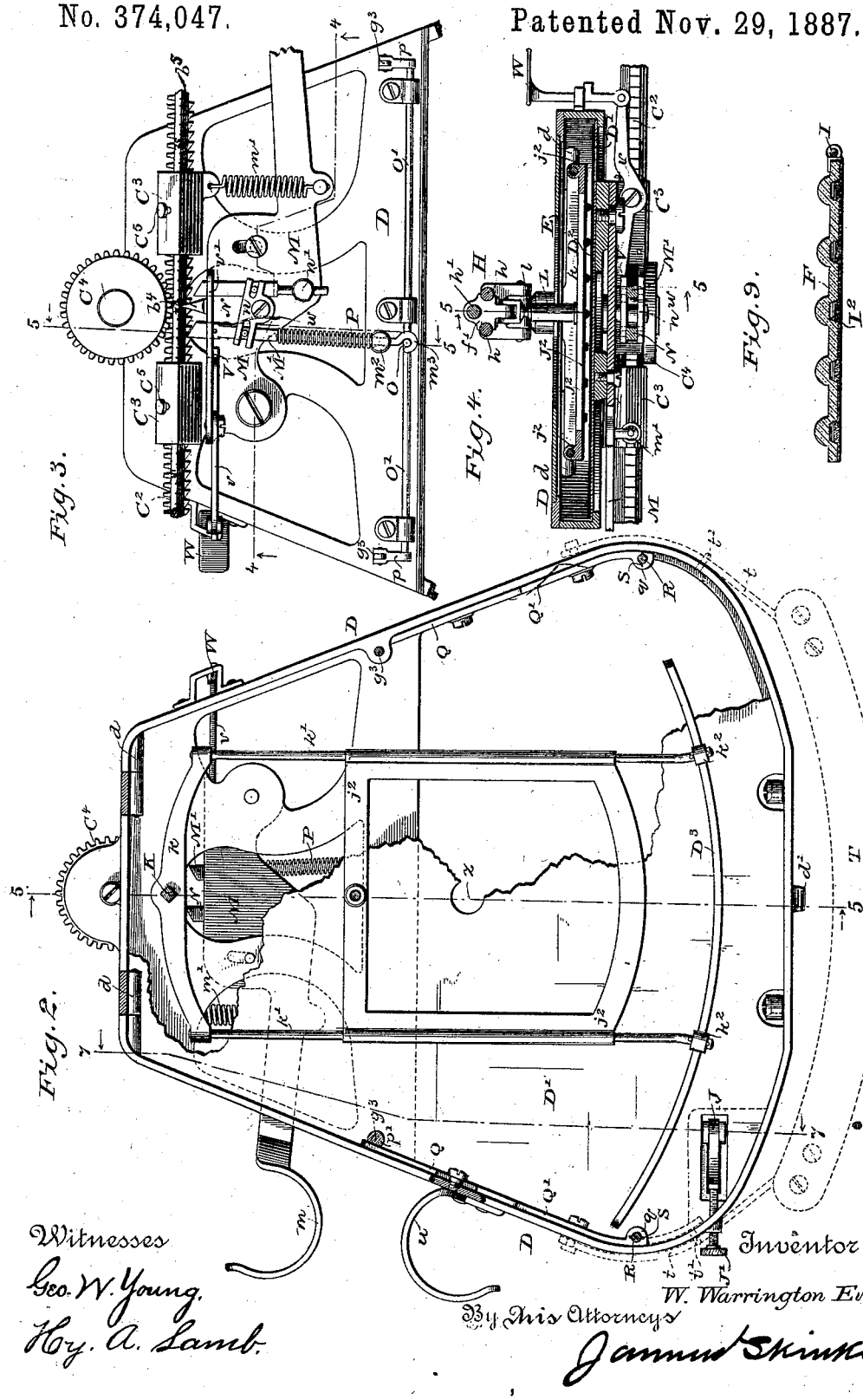
Witnesses
Geo. W. Young.
Hy. A. Lamb.
Inventor
W. Warrington Evans.
By his Attorneys
James Skinkle.

(No Model.) 4 Sheets—Sheet 3.

W. W. EVANS.
TYPE WRITING MACHINE.

No. 374,047. Patented Nov. 29, 1887.

Witnesses
Geo. W. Young.
Hy. A. Lamb.

Inventor
W. Warrington Evans.
By his Attorneys
James T. Skunkle.

(No Model.) 4 Sheets—Sheet 4.
W. W. EVANS.
TYPE WRITING MACHINE.
No. 374,047. Patented Nov. 29, 1887.
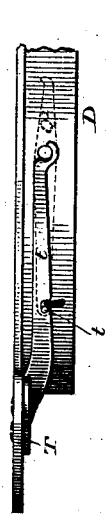
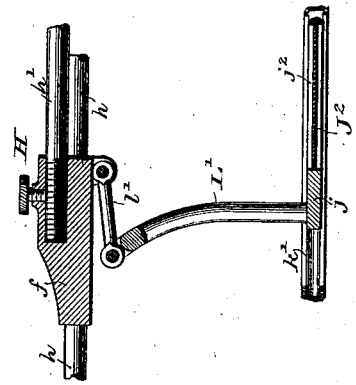
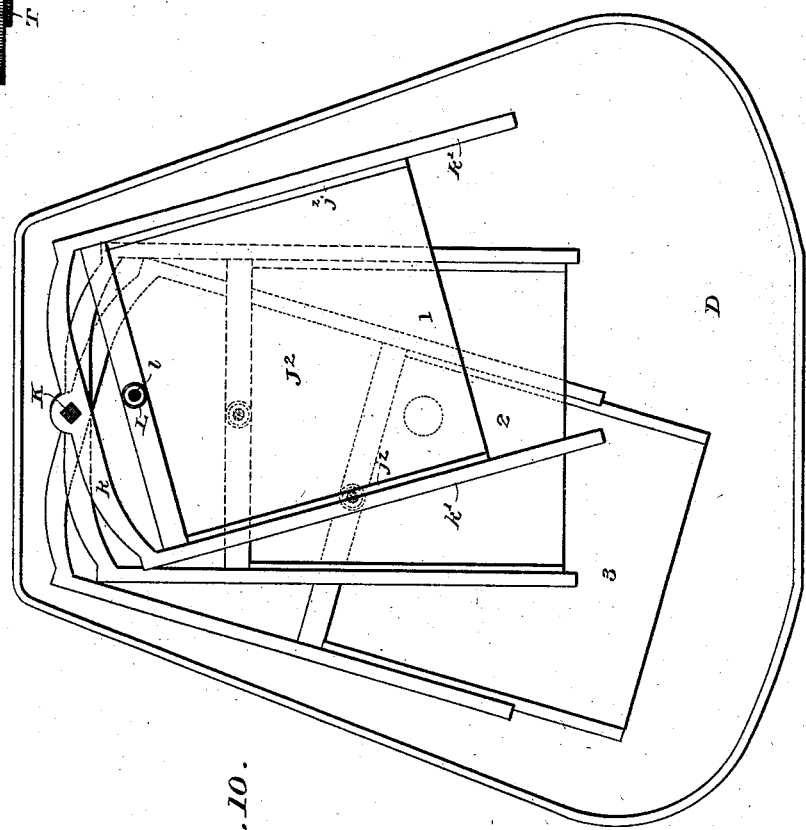
Witnesses
Geo. W. Young,
Hy. A. Lamb.
Inventor
W. Warrington Evans,
By his Attorneys
James S Kinkle
N. PETERS, Photo-Lithographer, Washington, D. C.

UNITED STATES PATENT OFFICE.

W. WARRINGTON EVANS, OF WASHINGTON, DISTRICT OF COLUMBIA.

TYPE-WRITING MACHINE.

SPECIFICATION forming part of Letters Patent No. 374,047, dated November 29, 1887.

Application filed December 26, 1885. Serial No. 186,704. (No model.)

*To all whom it may concern:*

Be it known that I, W. WARRINGTON EVANS, a citizen of the United States, residing at Washington, in the District of Columbia, have invented certain new and useful Improvements in Type-Writing Machines, of which the following is a description.

The present invention consists in various additions, modifications, and improvements in the general plan and details of the type-writer forming the subject-matter of my application for Letters Patent for type-writers, filed April 29, 1885, numbered 163,854, and will be hereinafter fully set forth.

Figure 1:
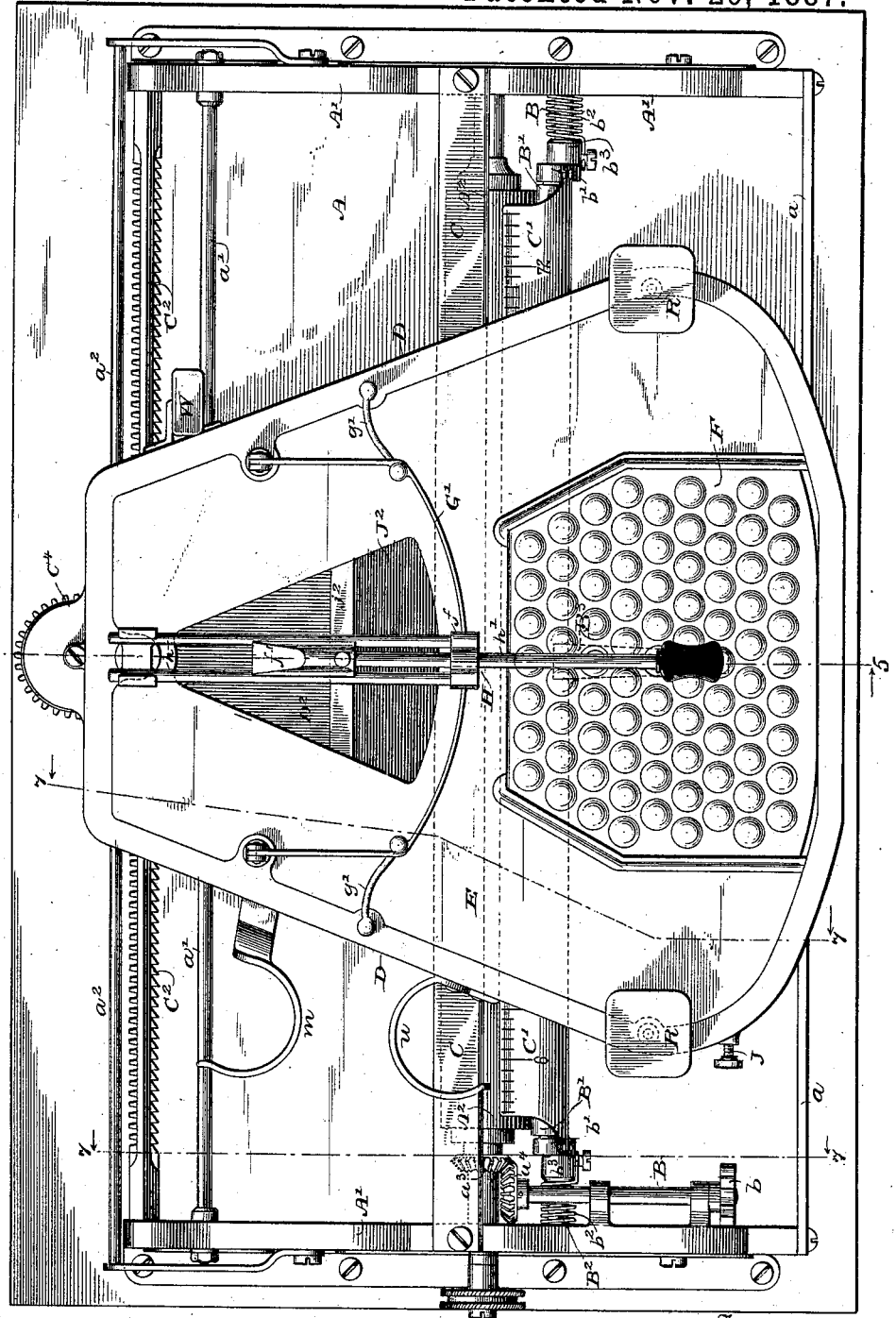
Figure 6:
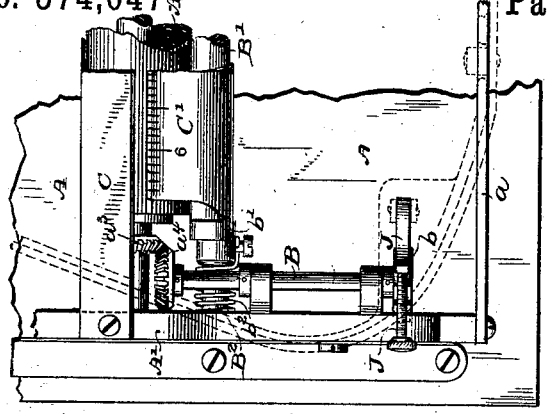
Figure 8:
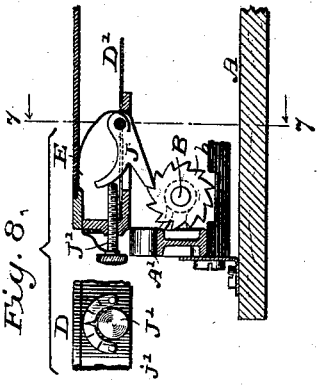
Figure 5:
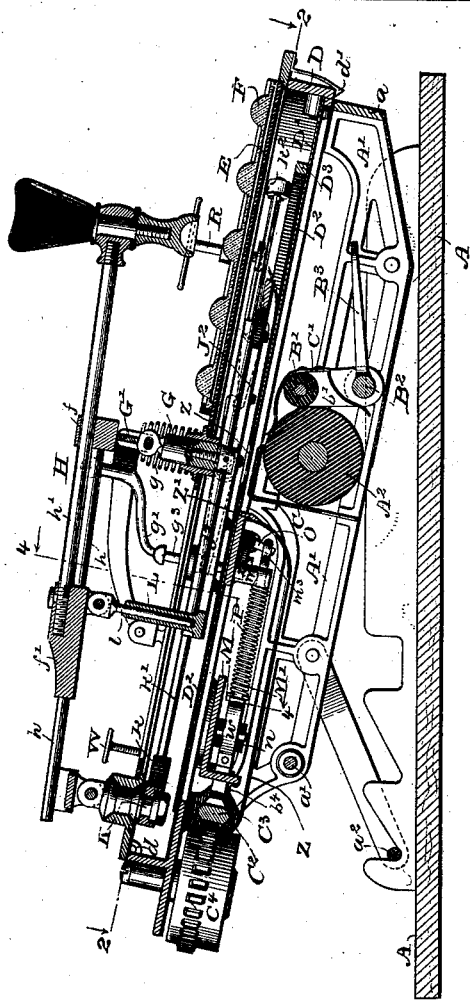
Figure 7:
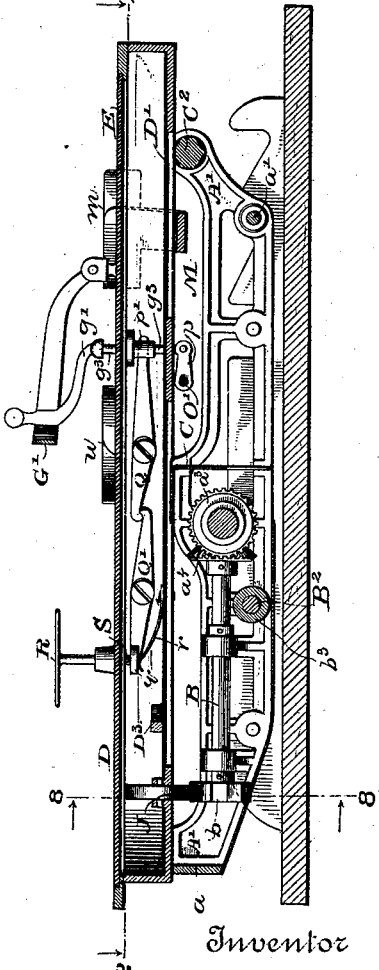

In the accompanying drawings, Figure 1 is a plan view of my improved type-writer. Fig. 2 is a plan view of the carriage with the top plate removed and a portion of its bottom plate broken away, showing also a part of the escapement. Fig. 3 is an inverted plan view of the upper portion of the carriage, showing the escapement mechanism. Fig. 4 is a sectional elevation on the lines 4 4 of Fig. 3. Fig. 5 is an end elevation, partly in section, on the lines 5 5 of Figs. 1, 2, 3, and 4. Fig. 6 is a detail plan showing the paper-spacing mechanism. Fig. 7 is an elevation, partly in section, on the lines 7 7 of Figs. 1, 2, and 8. Fig. 8 is a detail showing the means for actuating and controlling the paper-spacing mechanism. Fig. 9 is a detail of a modification of the index-plate. Fig. 10 is a diagram showing the type-form and frame. Fig. 11 is a detail showing an alternative form of connection between the key-lever and type-form. Fig. 12 is a detail of the attachment of the spacing-board.

Similar letters denote like parts.

A represents a board, upon which are secured end pieces, A' A', of any suitable material, and $a\ a'$ are side pieces secured thereto, forming, with the end pieces, a rigid rectangular frame, within and upon which the various parts of the apparatus are mounted. The frame is further provided with a suitable prop, $a^2$.

Within the frame is mounted the paper-roller $A^2$, at one end of which is secured a small bevel gear-wheel, $a^3$, which meshes with a similar wheel, $a^4$, carried upon a shaft, B, mounted in suitable bearings attached to the end piece, A', and transverse to the axis of the roller $A^2$. The shaft B carries a ratchet-wheel, $b$, at its outer end, which is acted upon by a pawl carried by the carriage, as will be hereinafter explained. A second and similar roller, B', is mounted upon extensions $b'$ from an axis, $B^2$, suitably journaled in the end pieces, A', and arranged to bring the roller B' parallel with and near the upper portion of the main roller, $A^2$, against which it is held by suitable springs, $b^2$, which are placed upon the ends of said axis $B^2$, where they are adjustably secured by collars $b^3$. A handle, $B^3$, extends transversely from the axis $B^2$, and when pressed downward partially rotates the axis $B^2$, and thereby separates the rollers to allow movement of or insertion of the paper.

A strip, C, secured at each end to the frame, extends along the top of roller $A^2$, and constitutes the printing-platen, and a shield, C', provided with a graduated scale, is placed over and moves with the smaller roller, to insure the paper taking the desired course, which is under the larger roller, up between both rollers, and then back over the printing-surface.

A bar, $C^2$, formed with a continuous rack at one side and a continuous ratchet at the other, the top and bottom edges or surfaces being smooth and plain, is journaled in the end pieces of the frame, and the carriage is mounted directly thereon, being supported by bearings $C^3$, which rest upon the smooth surfaces of the bar, which, being angular, does not turn within the aforesaid bearings, but itself serves as a hinge for the carriage as a whole. The bar is further provided with a graduated scale, $b^5$, along its under side, which scale corresponds with that on the paper-shield, and in connection with a pointer, $b^4$, fixed to the under side of the carriage, serves to indicate the position of the printing-opening when the carriage is raised or thrown back for inspection of the work. A box-spring, $C^4$, secured to the carriage, is provided with an annular rack meshing with that on the bar $C^2$, and being released step by step imparts the desired intermittent motion thereto.

The carriage consists of a light metallic frame, D, formed in two parts, hinged at the upper end at $d$ and provided with suitable catch, $d'$, at the lower end. Within this frame is placed the bottom plate, D', which carries the inking-pad $D^2$ and a section of circular track, $D^3$. The top plate, E, being fixed in the upper and hinged portion of the frame, carries the index-plate F and plunger G. The plates D' and E are preferably formed of wood, celluloid, vulcanite, or similar comparatively light substance, the metallic frame imparting the strength necessary to support the actively-moving parts, all of which, except the plunger, pass through the extension in the upper metallic frame.

The key-lever H is similar in principle and operation to that described in my previous application, as also is the plunger, which is normally held upward by a suitable spring, $g$, and suspended from a pivoted frame, G', the front portion of which conforms in outline to and lies in the path of the pivoted portion of the key-lever. The frame G' is provided with lateral extensions $g'$ $g'$, which rest upon vertical pins $g^3$, that extend downward and connect with the system of levers by which the spacing mechanism is operated, thus securing an even and regular distribution of strain upon the frame G' in all positions of the key-lever. The key-lever is hinged and pivoted at its upper end, and the hinged and pivoted portion is formed of two rods, $h$, secured at their lower end in a guide-block, $f$, which rests and moves upon the frame G'.

The telescopic piece consists, as shown, of a single rod, $h'$, although two may be used, if desired, and the rod or rods pass through the guide-block and into a runner or cross-head, $f'$, which moves freely between the rods $h$ of the pivoted portion, thus avoiding double friction on the frame G, and at the same time decreasing to almost nothing the visual obstruction of the letters on the index or indicator plate by the key-lever when in an extended position. A pivoted hand-piece provided with a cupped extension at its lower portion is attached to the free extremity of the telescopic section $h'$ of the key-lever.

The index-plate F is formed of transparent material and with semi-spherical or rounded projections on its upper surface to receive the key. The plate is also provided with an extension-frame to protect it from injury, which frame is preferably attached to the plate D by a hinge, I, so that the index-plate may at any time be readily raised for the insertion of a different set of characters. Where the plate is countersunk, as in Fig. 9, a specially-prepared pad, $I^2$, preferably of somewhat elastic material, as a protection to the glass, is used, and is provided with short projections, upon which the character-marks are placed, and thereby brought nearer to the surface of the glass; but, as shown in Fig. 5, the plate F may be perfectly smooth underneath and be permanently raised from the bed-plate by its supporting-frame, leaving a space between it and its bed, into which a card bearing the character-marks can readily be inserted or withdrawn.

At the lower left-hand corner of the carriage is placed a pawl, J, which depends therefrom and strikes the ratchet-wheel $b$ when the carriage is brought back at the beginning of a line. A stop in the form of an adjusting screw, J', is located in the path of the pawl and limits its descent, and thereby controls the point at which the pawl engages the wheel $b$ and the extent to which it is rotated thereby. An indicator-scale, $j$, is secured to the side of the carriage, and the screw J' is provided with a suitable pointer, by means whereof the position of the pawl, and consequently the extent to which the paper-roller is turned and the space left between the lines of printing, can be readily ascertained and controlled.

The type-form $J^2$ consists of a plate of elastic material—such as rubber—upon the lower surface of which the type are placed or formed. The edges of this plate are protected by an exterior frame, $j^2$, to which is secured the actuating mechanism.

The pivot K of the key-lever is extended downward into the space between the top and bottom plates of the carriage, and to it is secured a light frame consisting of an end piece, $k$, and side rods, $k'$, upon or between which the type-form is mounted and arranged to have the greatest freedom of reciprocating motion therein. The frame $k$ $k'$ is supported upon the pivot K, moving radially in accordance with the radial movement of the key-lever, and it is wholly supported by the aforesaid pivot, upon which it has the greatest freedom of movement. As a matter of precaution and to prevent uneven wear of its support, the rods $k'$ may be prolonged beyond the limit of movement of the type-form and provided with anti-friction rollers $k^2$, resting and traveling upon the track $D^3$. The rollers may, however, be omitted and the rods rest directly upon the track, although the use of rollers is preferable.

As shown in Figs. 10 and 11, the sides of the frame $k$ $k'$, instead of being round rods, are hollow and V-shaped, the type-form sliding within instead of thereupon. The type-form is swung radially in accordance with the movements of the key-lever as a whole; but its longitudinal motion is controlled by the telescopic end portion, to which it is connected by a vertical slip-joint consisting of a tube, L, secured to its frame, the connection being completed by a rod, $l$, fitting into the tube and hinged to the cross-head $f'$. A solid post, L', may be substituted for the tube L, and a link, $l'$, for the rod $l$, as shown in Fig. 11.

Against the under side of the frame of the carriage is pivoted a flat arm or support, M, which extends outward, terminating in a handle, $m$. This arm is normally held in position by a suitable spring, $m'$. Two pawls, M' N, are connected near their front ends on opposite sides of a rock-arm, $n$, pivoted upon the arm M, their other ends being suitably supported and guided in posts $m^2$ and $n'$. The pawl M' is the longer of the two and extends rearwardly, passing loosely through its post $m^2$; and it is further provided with a hook, $m^3$, at its outer end, which hook surrounds a pin, $o$, upon a rock-shaft, O', which is suitably journaled against the lower side of the carriage in a position transverse to the pawls. The pawl M' is provided with a suitable spring, P, by which it is normally held in engagement with the ratchet on the bar $C^2$. The rock-shaft O' is provided at each end with cranks $p$, to which are connected the vertical pins $g^3$, extending from the frame G'. The pins $g^3$ are surrounded by collars $p'$; or they may be provided with transverse pins or stops, to which are connected the pivoted levers Q, extending along the inside of the frame of the carriage. The levers Q connect with other and similar levers, Q', upon or near the free ends of which, upon suitable enlargements, $q$, rest the stems of the spacing-keys R, which stems may, if desired, be provided with transverse pins or heads S, to prevent the keys from falling out when the top of the carriage is raised. Suitable retracting-springs, $r$, are placed under the levers Q'. A spacing-board, T, is also provided, and it extends across the bottom edge of the carriage, where it is removably secured by means of extensions $t$, which pass around to the sides and pivot on the axis of the levers Q', from the free extremities of which extend pins $t'$, passing through slots in the frame of the carriage, and under the extensions $t$ of the spacing-board, and through which the downward motion of the spacing-board is transmitted to the escapement. The board being also readily removable will be found very useful. A hook, $u$, is fixed to the side of the carriage in proximity to the hook $m$.

In operation the movement of the key-lever to position above the desired character on the index-plate produces a corresponding movement of the frame and type-form in exact accordance with its own motion, bringing the corresponding character of the type-form under the plunger, which is then depressed by the movement of the key-lever incident to placing the key on the character projection of the index-plate, which same movement presses down the pins $g^3$, rocking the shaft O', and thereby retracting the pawl M', which in turn vibrates the rock-arm $n$ and projects the other pawl, N, into engagement with the ratchet. On raising the key-lever, and thereby reversing the movement and position of the parts just described, the box-spring will move the carriage laterally to the extent of one tooth of the ratchet, which represents the space required for one letter. The extent of the movement is adjusted by a movable stop, V, which is pivoted to the arm M in the lateral path of the pawl M', and said stop is formed on the end of the lever $v$, which is connected to a vertically-moving adjusting-key, W, secured to the side of the carriage, and by means of which the lever can be raised or lowered from or into the path of the said pawl M', and the lateral movement thereof, under the influence of spring $w$, attached thereto, and the consequent travel of the carriage, be limited to one tooth of the ratchet or allowed to extend to two. It will be obvious that by shortening the lever $v$ more than two spaces can be included in each movement, if desired. An inking-pad, $D^2$, surrounds the printing-opening $z$, and as one character is pressed therethrough and upon the paper the remainder are inked. Independent spacing between words or for any purpose is produced through the spacing-board or either of the side keys, R, all of which operate upon the rock-shaft and escapement through the compound levers Q Q'. The pawl M' has considerable freedom of movement through its guide-post $m^2$, and its rearward lateral motion is regulated by a lever, $v$, pivoted to the fixed strip $v'$, through which the front end of the pawl passes. The arm M is pivoted as described, and when it is desired to move the carriage independent of the spacing mechanism and to return it after printing a line the hooks $m$ $u$ are grasped between the thumb and forefinger, and the arm M will be moved upon its pivot and the pawls released, leaving the force of the spring against the hand of the operator, who then, retaining hold of the hooks, moves the carriage to the desired point, and then releases the hooks, the pawl M' passing at once into engagement with the ratchet and holding the carriage. The backward movement of the carriage rewinds the spring $C^4$. The escapement is protected and inclosed by a suitable shield, Z, which hooks over the pins $C^5$ at one side, and is sprung into position behind a ledge, Z', extending from the under side of the bottom plate, D', and by which it is removably secured in position, giving free exit to the paper, and also preventing oil dropping from the moving parts and injuring the work.

I do not herein claim the combination of a telescopic key-lever consisting of a hinged and pivoted portion and an end piece sliding thereon and a type-form secured directly to said end piece and moving in accordance therewith; nor do I in the present application broadly claim the transparent indicator-plate formed with fixed semi-spherical projections, such constructions being embodied in a separate application filed by me April 29, 1885, No. 163,854.

Having described my invention, what I claim, and desire to secure by Letters Patent, is—

1. In a type-writing machine, a telescopic key-lever consisting of a hinged and pivoted portion and an end piece longitudinally movable thereon, a frame vibrating about the same axis as the key-lever, and a type-form mounted upon said frame and adapted to move longitudinally thereon and connected to the end piece of the key-lever and moving in accordance therewith, substantially as described.

2. In a type-writing machine, a telescopic key-lever consisting of a hinged and pivoted portion and an end piece longitudinally movable thereon, a frame vibrating about the same axis as the key-lever and provided with means for additionally supporting its free ends, and a type-form mounted upon said frame and connected to the end piece of the key-lever and moving in accordance therewith, substantially as shown and described.

3. In a type-writing machine, a telescopic key-lever consisting of a hinged and pivoted portion and an end piece longitudinally movable thereon, a frame vibrating about the same axis as the key-lever, and a type-form mounted upon said frame and adapted to be moved longitudinally thereon, and a vertically-yielding connection between the type-form and the end piece of the key-lever, whereby said type-form is moved longitudinally upon its support in accordance with the play of said end piece, substantially as described.

4. In a type-writing machine, the combination, with a telescopic key-lever consisting of a hinged and pivoted portion and an end piece longitudinally movable thereon, of a frame consisting of an end piece secured to the pivot of the key-lever and side pieces extending therefrom and provided at their free extremities with rollers, a suitable track therefor, and a type-form secured within a frame which is mounted upon the side pieces of the pivoted frame and adapted to slide freely thereon, substantially as described.

5. In a type-writing machine, the combination, with a fixed indicator-plate and a pivoted key-lever having a longitudinally-moving end portion provided at its free extremity with a key adapted to register with the character-marks on the indicator-plate, of a frame vibrated about the axis of the key-lever by the radial movements thereof, and an elastic type-form mounted upon said frame and connected directly with the end piece of the key-lever, whereby it is moved longitudinally upon its support and into position for printing when the key is placed above the desired character-indicator, and means, substantially as described, operated by said key-lever for depressing the character for printing, substantially as set forth.

6. In a type-writing machine, the combination, with an intermittently-moving carriage, of a hinged and pivoted key-lever provided with a longitudinally-movable end portion, a frame vibrated upon the axis of the key-lever by the radial movement thereof, a movable type-form mounted upon said frame and connected directly to the end piece of the key-lever, a plunger suspended above a printing-opening in the lower surface of the carriage and in the path of the said key-lever, whereby when the type-form is brought to the desired position the depression of the lever will actuate the plunger and the character be projected through the printing-opening thereby, substantially as set forth.

7. In a type-writer, the combination of a ratchet-bar, a carriage mounted thereon, and means, substantially as described, for propelling it along the bar, with means for restraining it against propulsion or intermittingly releasing it, said means consisting of a pair of pawls alternately projecting endwise into the ratchet, said pawls being mounted upon a movable support on the carriage and adapted to be rendered inoperative and the carriage released when their support is removed from its normal position, substantially as described.

8. In a type-writer, the combination of a ratchet-bar, a carriage mounted thereon, and means for propelling it along the bar, a pawl, M', normally engaging the ratchet, and means, substantially as described, connected with the printing devices for withdrawing it therefrom, a pawl, N, normally disengaged from the ratchet, and a lever centrally pivoted and connected at its ends to the pawls, whereby the retraction of the pawl M' advances the pawl N into engagement with the ratchet, as set forth.

9. In a type-writer, the combination of a ratchet-bar, a carriage mounted thereon, and means, substantially as described, for propelling it laterally along the bar, an endwise-moving pawl, M', normally engaging the ratchet and provided with a spring adapted to impart lateral motion to it when retracted, and a pawl, N, substantially as described, connected to and forced endwise into the ratchet by the pawl M' when retracted, substantially as hereinbefore set forth.

10. In a type-writer, the combination of a ratchet-bar, a carriage mounted upon the bar and propelled therealong, means, substantially as described, for restraining or releasing it step by step, consisting of a pair of pawls, M' N, alternately projected endwise into the ratchet, a spring to impart lateral motion to the front end of the pawl M', and a pivoted dog lying in the path of said pawl to limit or define its lateral throw, substantially as set forth.

11. In a type-writer, the combination, with the carriage and means, substantially as described, for propelling the same and for controlling the movements thereof, of levers Q Q' and a detachable spacing-board, T, having extensions $t$, substantially as shown and described.

12. In a type-writer, the combination, with suitable frame, of a rack and ratchet bar provided with a scale at its under side and a carriage adapted to be propelled along said bar and provided with a pointer in proximity to said scale, as set forth.

13. In a type-writer, a pivoted telescopic key-lever consisting of a hinged and pivoted portion formed of the rods $h$, fixed in the head-block $f$, a cross-head, $f'$, moving between or upon said rods $h$, and a rod, $h'$, secured to the cross-head and passing through the head-block and provided with a suitable key at its free extremity, as set forth.

14. In a type-writer, the combination, with the longitudinally-moving end piece, a cross-head, and a hinged and pivoted portion, of the type-form frame, a post, L', secured thereto, and a link, $l'$, extending between the post and the cross-head, substantially as shown and described.

15. In a type-writer, the combination, with a carriage and means, substantially as described, for propelling the same laterally, of the key-lever, the frame G', having extensions g', the rock-shaft O', and connections between the ends thereof and the said extensions g', and escapement devices operated by the depression of the key-lever and the rocking of the shaft O', as set forth.

16. In a type-writer, the combination, with the transparent index-plate F, having projections at its upper side and openings extending partially into said projections from below, of a pad, I², formed with projections extending into said openings and carrying the character indicators, as set forth.

17. In a type-writer, the combination, with suitable frame, of a main paper-roller, a supplemental roller, a spring arranged to press the said supplemental roller against the main roller, thereby securing the paper in position between the said rollers and opposing their rotation by frictional resistance, a shield carried by the supplemental roller for directing the course of the paper, and means for retracting said roller and shield for the insertion or removal of the work, as set forth.

18. In a type-writer, the combination, with a frame and a paper-roller provided with suitable gear-wheel at one end, of a shaft carrying a gear-wheel at one end, meshing with the wheel on the roller, and a ratchet-wheel at the other, a carriage and a pawl on said carriage in the path of the ratchet, and means, as described, for adjusting said pawl so as to engage said ratchet-wheel to a greater or less extent, as set forth.

19. The combination, with paper-roller A², carrying gear $a^3$, and suitable supports therefor, of shaft B, carrying gear $a^4$, meshing with said gear $a^3$, and a ratchet, $b$, the carriage, the pawl J, adjusting-screw J', and indicator $j'$, as shown and described.

In testimony whereof I hereto affix my signature in presence of two witnesses.

W. WARRINGTON EVANS.

Witnesses:
MAMIE MILES,
HENRY A. LAMB.